(12) United States Patent
Matsumoto (10) Patent No.: US 10,885,103 B2
(45) Date of Patent: Jan. 5, 2021

(54) CELL IMAGE SEARCH APPARATUS, METHOD, AND PROGRAM

(71) Applicant: FUJIFILM Corporation, Tokyo (JP)

(72) Inventor: Tsuyoshi Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 246 days.

(21) Appl. No.: 15/994,256

(22) Filed: May 31, 2018

(65) Prior Publication Data

US 2018/0276246 A1    Sep. 27, 2018

Related U.S. Application Data

(63) Continuation of application No. PCT/JP2016/005183, filed on Dec. 20, 2016.

(30) Foreign Application Priority Data

Dec. 25, 2015 (JP) ................... 2015-253609

(51) Int. Cl.
*G06F 16/583* (2019.01)
*G06F 16/51* (2019.01)
(Continued)

(52) U.S. Cl.
CPC .......... *G06F 16/5838* (2019.01); *G06F 16/00* (2019.01); *G06F 16/51* (2019.01);
(Continued)

(58) Field of Classification Search
CPC ...... G06K 9/0014; G06K 9/6212; G06T 7/97; G06T 2207/10056; G06T 7/0014;
(Continued)

(56) References Cited

U.S. PATENT DOCUMENTS

| 6,690,828 B2 * | 2/2004 | Meyers ................... G06K 9/46 358/515 |
| 2010/0195877 A1 | 8/2010 | Oonishi et al. |

(Continued)

FOREIGN PATENT DOCUMENTS

| JP | 2007-287027 A | 11/2007 |
| JP | 2009-9290 A | 1/2009 |

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2016/005183, dated Jul. 5, 2018, with English translation.

(Continued)

*Primary Examiner* — Ken Hoang
(74) *Attorney, Agent, or Firm* — Birch, Stewart, Kolasch & Birch, LLP (57) ABSTRACT

The cell image search apparatus includes: an image set storage unit; a captured image acquisition unit that acquires a plurality of captured images obtained by imaging cells in time series; an image feature amount extraction unit that extracts an image feature amount from each cell image of the image set and each of the plurality of captured images; an image search unit that searches for a captured image similar to each cell image of the image set, among the plurality of captured images, based on image feature amounts of each cell image of the image set and the plurality of captured images; and a search result output unit that outputs a search result in a case where captured images similar to at least two cell images included in the image set are searched for by the image search unit.

12 Claims, 7 Drawing Sheets

(51) Int. Cl.
- *G06F 16/54* (2019.01)
- *G06F 16/58* (2019.01)
- *G06F 16/00* (2019.01)
- *G06K 9/62* (2006.01)
- *G06K 9/00* (2006.01)
- *G06T 7/00* (2017.01)

(52) U.S. Cl.
CPC .......... *G06F 16/54* (2019.01); *G06F 16/5866* (2019.01); *G06K 9/0014* (2013.01); *G06K 9/6212* (2013.01); *G06T 7/0014* (2013.01); *G06T 7/97* (2017.01); *G06T 2207/10016* (2013.01); *G06T 2207/10056* (2013.01); *G06T 2207/30024* (2013.01)

(58) Field of Classification Search
CPC . G06T 2207/10016; G06T 2207/30024; G06F 16/54; G06F 16/5866; G06F 16/5838; G06F 16/00; G06F 16/51
See application file for complete search history.

(56) References Cited

U.S. PATENT DOCUMENTS

| | | | | |
|---|---|---|---|---|
| 2010/0260406 | A1* | 10/2010 | Sammak | G06K 9/00127 382/133 |
| 2012/0106822 | A1 | 5/2012 | Mimura et al. | |
| 2012/0134571 | A1* | 5/2012 | Ito | G06T 1/00 382/133 |
| 2015/0002812 | A1* | 1/2015 | Yoshihara | G06T 7/0016 351/206 |
| 2015/0131889 | A1 | 5/2015 | Aragaki | |
| 2017/0273933 | A1* | 9/2017 | Zhang | A61K 31/192 |

FOREIGN PATENT DOCUMENTS

| | | | | |
|---|---|---|---|---|
| JP | 2009-162708 | A | 7/2009 | |
| JP | 2010-181402 | A | 8/2010 | |
| JP | 2014-29287 | A | 2/2014 | |
| JP | 2014041084 | A * | 3/2014 | ............... G06T 7/40 |
| JP | 2014-83042 | A | 5/2014 | |
| WO | WO 2010/146802 | A1 | 12/2010 | |
| WO | WO 2012/099005 | A1 | 7/2012 | |

OTHER PUBLICATIONS

International Search Report (Form PCT/ISA/210) for International Application No. PCT/JP2016/005183, dated Mar. 28, 2017, with English translation.

Japanese Notification of Reasons for Refusal for Japanese Application No. 2015-253609, dated Feb. 19, 2019, with English translation.

Korean Office Action, dated Jun. 7, 2019, for corresponding Korean Application No. 10-2018-7017904, with an English machine translation.

European Office Action, dated Feb. 26, 2020, for corresponding European Application No. 16877986.6.

Extended European Search Report, dated Aug. 31, 2018, for corresponding European Application No. 16877986.6.

Simily, "Classification and Content Based Retrieval of Digital Mammograms and Placental Sonograms," Chapter 6, Multiple Image Query System for Medical Image Retrieval, Doctoral Thesis, Cochin University of Science and Technology, Aug. 2013 (Aug. 1, 2013), pp. 159-179, XP055501675.

Taghizadeh et al., "A Novel Method for Multiple-Query Image Retrieval," Signal Processing and Intelligent Systems conference (SPIS2015), Amirkabir University of Technology, Tehran, Iran, Dec. 16-17, 2015, pp. 63-66, XP032875599.

Yang et al., "Video-based Image Retrieval," M '11, Scottsdale, Arizona, USA, Nov. 28-Dec. 1, 2011, 4 pages, XP055501655.

Korean Office Action for corresponding Korean Application No. 10-2018-7017904, dated Dec. 20, 2019, with partrial English machine translation.

* cited by examiner

CELL IMAGE SEARCH APPARATUS, METHOD, AND PROGRAM

CROSS-REFERENCE TO RELATED APPLICATIONS

This application is a continuation application of International Application No. PCT/JP2016/005183, filed Dec. 20, 2016, the disclosure of which is incorporated herein by reference in its entirety. Further, this application claims priority from Japanese Patent Application No. 2015-253609, filed Dec. 25, 2015, the disclosure of which is incorporated herein by reference in its entirety.

BACKGROUND

1. Technical Field

The present invention relates to a cell image search apparatus, method, and program for searching for a desired captured image among a plurality of captured images obtained by imaging cells in time series.

2. Related Art

Conventionally, a method of imaging pluripotent stem cells such as embryonic stem (ES) cells and induced pluripotent stem (iPS) cells, differentiated cells, or the like using a microscope or the like and evaluating the differentiation state of cells by ascertaining the features of the image has been proposed.

For example, JP2014-083042A has proposed a method of acquiring images obtained by imaging cells in time series, calculating an index relevant to the movement speed of the cells based on the plurality of images, and evaluating the proliferative capacity of the cells based on the index. JP2010-181402A has proposed a method of acquiring images obtained by imaging a fertilized egg in time series and specifying the active site of the fertilized egg based on the differences among the plurality of images.

SUMMARY

Here, in the case of performing time-lapse imaging of cells in the culturing process, a large amount of images captured in time series are acquired. However, there is a case where the user desires to observe only an image of interest among the images. Alternatively, there is a case where the user desires to be notified at the point in time at which the image of interest is captured, so that a culturing technique, such as medium exchange or passage, is immediately performed.

In such a case, for example, as described in JP2014-083042A and JP2010-181402A, there is a method of calculating an image feature amount from a captured image and determining whether or not the captured image is an image of interest using the image feature amount.

However, there is a case where it is not possible to determine whether or not the image is an image of interest, which is obtained by imaging target cells, by merely using the image feature amount of the image at one point in time. For example, in a case where the user desires to observe an image of a cell group mature to some extent while maintaining the undifferentiated state, it is possible to consider a method of calculating the amount (area) of white streaks in each of a plurality of images obtained by imaging such a cell group and searching for an image of interest based on the amount (area) of white streaks. The white streaks are light blurring (halo) due to diffracted light generated between cells (samples) and the background.

Figure 2:
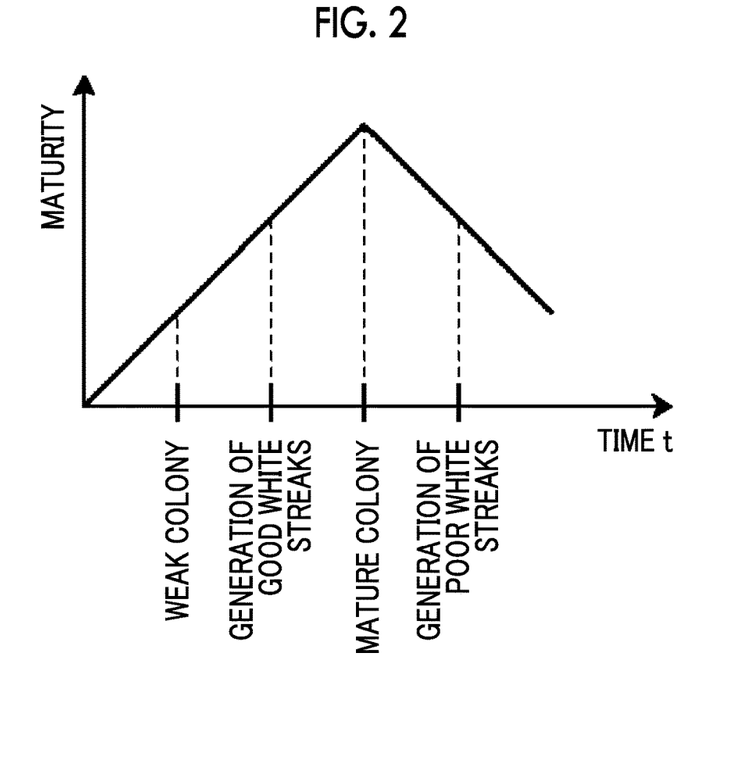
FIG. 2 is a diagram illustrating the generation state of white streaks in the cell culturing process.

However, as shown in FIG. 2, white streaks generated in the cell group not only are generated while growing from a weak colony to a mature colony with the cell group maintaining the undifferentiated state (good white streaks in FIG. 2) but also are generated due to liberation of cells from the cell group after the cell group becomes mature (poor white streaks in FIG. 2). Therefore, in a case where only one image of a cell group, in which white streaks are generated in a state in which the undifferentiated state is maintained, is used to search for similar images based on the amount (area) of white streaks included in the image, there is a possibility that not only a desired captured image but also a captured image of a cell group, in which the same amount (area) of white streaks are generated due to liberation of cells from the cell group, will be searched for. This is not a captured image of a cell group maintaining the undifferentiated state, which is not preferable since the image becomes noise.

A mature cell group is in a state in which cells are aggregated. Therefore, it is also possible to consider a method of calculating the number of cells or the density of cells in an image instead of calculating the amount of white streaks as described above and searching for an image having a large number of cells or an image having a high cell density as an image of interest.

However, in a case where similar images are searched for based on the number of cells or the density of cells, an image obtained by imaging a portion with a high seeding density or an image in which cells are weakened to be intentionally collected happens to be searched for. This becomes noise.

In view of the aforementioned problems, it is an object of the present invention to provide a cell image search apparatus, method, and program capable of searching for a captured image in which a user is interested, among a plurality of captured images obtained by imaging cells in time series, with high accuracy.

A cell image search apparatus of the present invention comprises: an image set storage unit that stores an image set including a plurality of cell images at different points in time in a cell culturing process; a captured image acquisition unit that acquires a plurality of captured images obtained by imaging cells in time series; an image feature amount extraction unit that extracts an image feature amount from each cell image of the image set and each of the plurality of captured images; an image search unit that searches for a captured image similar to each cell image of the image set, among the plurality of captured images, based on image feature amounts of each cell image of the image set and the plurality of captured images; and a search result output unit that outputs a search result in a case where captured images similar to at least two cell images included in the image set are searched for by the image search unit.

The cell image search apparatus of the present invention described above can further comprise a display control unit that displays the searched captured images on a display unit in a case where the captured images similar to at least two cell images included in the image set are searched for by the image search unit.

In the cell image search apparatus of the present invention described above, it is preferable that cell images of the image set are images having different cell shapes.

In the cell image search apparatus of the present invention described above, the image set can include a cell image obtained by imaging a cell group having white streaks and a cell image obtained by imaging a weak cell group before white streaks are generated.

In the cell image search apparatus of the present invention described above, the image set can include three or more cell images.

In the cell image search apparatus of the present invention described above, an image obtained by imaging the same cell in time series can be used as each cell image of the image set.

In the cell image search apparatus of the present invention described above, an image obtained by imaging a cell group to which drugs having different concentrations are added can be used as each cell image of the image set.

The cell image search apparatus of the present invention described above can further comprise a sequence information setting reception unit that receives a setting input of sequence information given to each cell image of the image set.

The cell image search apparatus of the present invention described above can further comprise an imaging unit that captures the captured image, and the image search unit can perform the search in real time during time-lapse imaging by the imaging unit.

In the cell image search apparatus of the present invention described above, the image search unit can perform the search using the plurality of captured images stored in advance.

A cell image search method of the present invention comprises: storing an image set, which includes a plurality of cell images at different points in time in a cell culturing process, in advance; acquiring a plurality of captured images obtained by imaging cells in time series; extracting an image feature amount from each cell image of the image set and each of the plurality of captured images; searching for a captured image similar to each cell image of the image set, among the plurality of captured images, based on image feature amounts of each cell image of the image set and the plurality of captured images; and outputting a search result in a case where captured images similar to at least two cell images included in the image set are searched for.

A cell image search program of the present invention causes a computer to function as: a captured image acquisition unit that acquires a plurality of captured images obtained by imaging cells in time series; an image feature amount extraction unit that extracts an image feature amount from each cell image of an image set, which is stored in advance and includes a plurality of cell images at different points in time in a cell culturing process, and each of the plurality of captured images; an image search unit that searches for a captured image similar to each cell image of the image set, among the plurality of captured images, based on image feature amounts of each cell image of the image set and the plurality of captured images; and a search result output unit that outputs a search result in a case where captured images similar to at least two cell images included in the image set are searched for by the image search unit.

According to the cell image search apparatus, method, and program of the present invention, an image set including a plurality of cell images at different points in time in the cell culturing process is stored in advance. Then, a plurality of captured images obtained by imaging cells in time series are acquired, the image feature amount is extracted from each cell image of the image set and each of the plurality of captured images, and a captured image similar to each cell image of the image set among the plurality of captured images is searched for based on the image feature amounts of each cell image of the image set and the plurality of captured images. Then, in a case where captured images similar to at least two cell images included in the image set are searched for by the image search unit, the search result is output. In this manner, since a captured image is searched for using the image set including a plurality of cell images, it is possible to search for a desired captured image with high accuracy without including noise as described above. Specific examples thereof will be described in detail later.

BRIEF DESCRIPTION OF THE DRAWINGS

Exemplary embodiments according to the technique of the present disclosure will be described in detail based on the following figures, wherein.

DETAILED DESCRIPTION

Figure 1:
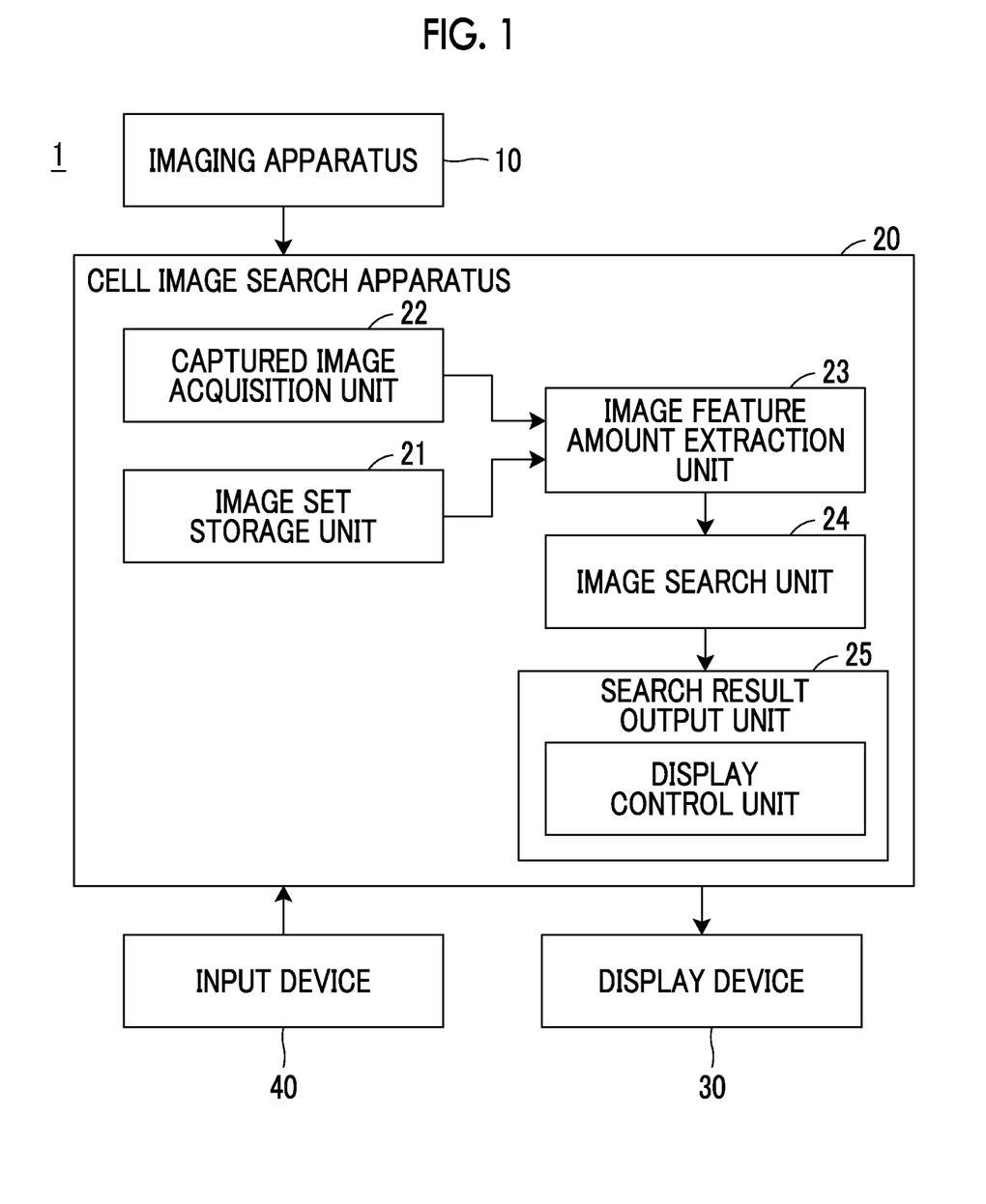
FIG. 1 is a block diagram showing the schematic configuration of a cell image search system using an embodiment of a cell image search apparatus of the present invention.

Hereinafter, a cell image search system using an embodiment of a cell image search apparatus, method, and program of the present invention will be described in detail with reference to the diagrams. FIG. 1 is a block diagram showing the schematic configuration of a cell image search system 1.

As shown in FIG. 1, the cell image search system 1 of the present embodiment includes an imaging apparatus 10, a cell image search apparatus 20, a display device 30, and an input device 40.

The imaging apparatus 10 captures an image of a cell group in the culturing process. The imaging apparatus 10 performs so-called time-lapse imaging, in which a cell group is imaged multiple times over time. The captured images of the cell group that have been captured in time series by the imaging apparatus 10 are output to the cell image search apparatus 20. Specific examples of the imaging apparatus 10 include a phase difference microscope apparatus, a differential interference microscope apparatus, a bright field microscope apparatus, a dark field microscope apparatus, and the like. Specific examples of cells to be imaged include pluripotent stem cells such as iPS cells and ES cells, cells of nerves, skin, myocardium, and liver differentiated from stem cells, cells of the skin, retina, myocardium, blood cells, nerves, and organs removed from the human body. The imaging apparatus 10 of the present embodiment corresponds to an imaging unit. Information of the imaging time is added to the captured image as necessary.

The cell image search apparatus 20 includes an image set storage unit 21, a captured image acquisition unit 22, an image feature amount extraction unit 23, an image search unit 24, and a search result output unit 25. The cell image search apparatus 20 is formed by installing an embodiment of an image search program of the present invention on a computer.

The cell image search apparatus 20 includes a central processing unit, a semiconductor memory, a hard disk, and the like, and an embodiment of the image search program of the present invention is installed on the hard disk. The program is executed by the central processing unit, so that the captured image acquisition unit 22, the image feature amount extraction unit 23, the image search unit 24, and the search result output unit 25 shown in FIG. 1 operate.

The image set storage unit 21 is a storage medium on which storage and reading of images are performed under the control of the central processing unit. For example, the image set storage unit 21 is a semiconductor memory, such as a solid state drive (SSD). The image set storage unit 21 stores an image set, which includes a plurality of cell images at different points in time in the cell culturing process, in advance.

The image set storage unit 21 stores a cell image used as a query image (also referred to as a search target image) in the case of searching for (checking) a captured image of a state of a cell group that the user desires to observe among a group of captured images. Here, the query image (search target image) stored in the image set storage unit 21 is referred to as a "cell image", and the image to be searched for is referred to as a "captured image".

Here, as described above, there is a case where the user desires to search for a captured image of a cell group mature to some extent, for example, in a state in which the undifferentiated state is maintained, among a group of captured images obtained by imaging cells in time series in the culturing process and observe the captured image or a case where the user desires to know whether or not a cell group included in captured images that are sequentially captured in time series has matured up to a desired state.

In such a case, in a cell group mature to some extent in a state in which the undifferentiated state is maintained, white streaks are generated. Therefore, a method of searching for a captured image based on the amount (area) of white streak can be considered. The white streaks are light blurring (halo) due to diffracted light generated between cells (sample) and the background.

However, as shown in FIG. 2, white streaks generated in the cell group not only are generated while growing from a weak colony to a mature colony with the cell group maintaining the undifferentiated state but also are generated due to liberation of cells from the cell group after the cell group becomes mature. Therefore, in a case where only one cell image of a cell group, in which white streaks (good white streaks in FIG. 2) are generated in a state in which the undifferentiated state is maintained, is used to search for a captured image based on the amount (area) of white streaks included in the cell image, there is a possibility that not only a desired captured image but also a captured image of a cell group, in which white streaks (poor white streaks in FIG. 2) having the same amount (area) are generated due to liberation of cells from the cell group, will be searched for. This is not a captured image of a cell group maintaining the undifferentiated state, which is not preferable.

Therefore, for example, a cell image of a cell group in which good white streaks are generated in a state where the undifferentiated state is maintained and a cell image of a weak cell group captured earlier in time than the cell group are used as query images. That is, the above-described two cell images are stored in the image set storage unit 21, and a search is performed using these cell images. Then, in a case where a plurality of captured images similar to the cell image of the cell group in which good white streaks are generated in a state where the undifferentiated state is maintained have been searched for, captured images that have been captured recently among the captured images similar to the cell image of the weak cell group are output as a final search result, so that the user can output a desired captured image.

At least two cell images serving as the query images described above are stored in the image set storage unit 21. By checking the plurality of cell images and a group of captured images, captured images similar to the plurality of cell images are searched for.

The type of each cell image included in the image set differs depending on the purpose of searching for (checking) a captured image. Here, although the image set in a case where the user desires to search for a captured image of a cell group mature to some extent while maintaining the undifferentiated state and observe the captured image has been described, examples of other image sets will be described in detail later.

The plurality of cell images stored in the image set storage unit 21 may be images captured by the imaging apparatus 10 included in the cell image search system 1 of the present embodiment, or may be images acquired by reading from an image server different from the cell image search system 1 of the present embodiment, or may be images published on the web, or may be images obtained by digitizing images posted in articles or the like. The plurality of cell images included in the image set may not necessarily be images obtained by imaging the same cell, and may be images obtained by imaging different cells. For example, in a case where a cell image obtained by imaging a cell group in the early stage of culturing and a cell image mature to some extent are used as an image set, the cell group in the early stage of culturing and the cell group mature to some extent may be a cell group of different cell lines.

Each cell image of the image set may be an image obtained by imaging a cell group to which drugs having different concentrations are added. Specifically, in the case of culturing a cell group by adding a drug such as a growth factor, a cell group to which a drug having a relatively low concentration is added and a cell group to which a drug having a relatively high concentration is added may be prepared, and a cell image obtained by imaging a cell group in the early stage of culturing and a cell image obtained by imaging a cell group mature to some extent may be acquired by acquiring images obtained by imaging these cell groups at the same time. By acquiring two cell images in this manner, it is possible to shorten the time required to acquire a cell image.

The cell group to be imaged in each cell image of the image may be cultured at different places within the same cell, or may be cultured in different cells.

Figure 3:
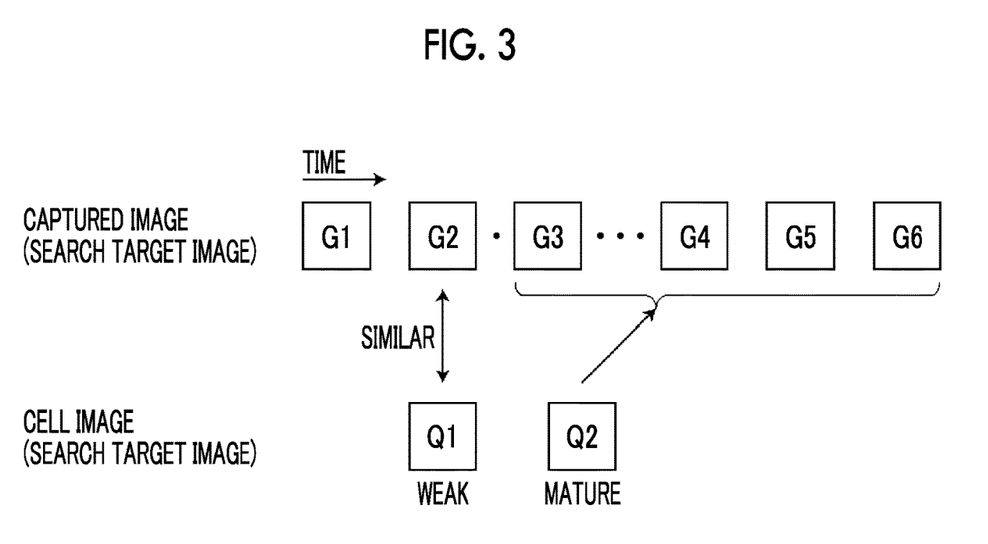
FIG. 3 is a diagram illustrating a case of narrowing down search target images.

It is preferable that the plurality of cell images stored in the image set storage unit 21 have information of a sequence in which the cell images have been captured. By using this information, as shown in FIG. 3, for example, in the case of searching for a captured image G2 similar to a cell image Q1 of a weak cell group captured earlier in time and then searching for a captured image similar to another cell image Q2 (a cell image of a cell group having white streaks while maintaining the undifferentiated state), captured images to be searched for can be narrowed down to captured images G3 to G6 that were captured later than the captured image G2 similar to the cell image of the weak cell group. As a result, it is possible to shorten the search time.

The captured image acquisition unit 22 acquires and stores the captured images that have been captured in time series by the imaging apparatus 10.

The image feature amount extraction unit 23 extracts an image feature amount from each cell image included in the image set and each captured image acquired by the captured image acquisition unit 22. As the image feature amount, it is possible to use a feature amount indicating the shape of a cell or a cell group that changes according to the state of the cell.

Features indicating the shape of a cell or a cell group include, for example, the number of cells included in the cell image, the density of cells, the shape of the cell, the size of the cell group, the shape of the cell group, the brightness of the image of the cell group, and the amount of white streaks included in the cell group. However, the present invention is not limited thereto, and any image feature amount may be used as long as the image feature amount is correlated with the quality of the cell and is a reversible shape feature. The image feature amount extracted by the image feature amount extraction unit 23 differs depending on the purpose of searching for a captured image. Specific examples thereof will be described in detail later. As a method of extracting the image feature amount described above, it is possible to use a known method.

Based on each cell image included in the image set and the image feature amounts of the plurality of captured images acquired by the captured image acquisition unit 22, the image search unit 24 extracts a captured image similar to each cell image included in the image set from the plurality of captured images.

Specifically, the image search unit 24 calculates a similarity between each cell image included in the image set and the plurality of captured images based on one or a plurality of types of image feature amounts, and searches for a captured image similar to each cell image included in the image set among the plurality of captured images based on the similarity. As a method of calculating the similarity, for example, in the case of calculating the similarity between each cell image of the image set and the captured image based on one type of image feature amount such as the number of cells, it is preferable to calculate the similarity such that the value increases as the difference in the one type of image feature amount decreases. In the case of calculating the similarity between each cell image of the image set and the captured image based on a plurality of types of image feature amounts, the similarity may be calculated using Deep Learning, for example. The method of calculating the similarity is not limited to these methods, and other known methods can be used. Alternatively, a low-dimensional feature amount may be calculated as an image feature amount using Bag of Visual Words, and a captured image similar to each cell image of the image set may be searched for based on the calculated low-dimensional feature amount.

The search result output unit 25 outputs the search result to the display device 30 in a case where captured images similar to all the cell images included in the image set have been searched for by the image search unit 24. Specifically, the search result output unit 25 of the present embodiment includes a display control unit 26, and the display control unit 26 displays a captured image searched for by the image search unit 24 on the display device 30.

The search result output unit 25 displays various kinds of information on the display device 30 according to the purpose of searching for a captured image, so that user is notified of the information. As will be described in detail later, for example, in a case where the purpose of search is the evaluation of the medicinal effect or the toxicity of the drug, which is added in the culturing process, using an image, the search result output unit 25 displays the presence or absence of the medicinal effect of the drug, the presence or absence of the toxicity of the drug, and the like on the display device 30 as a search result.

The display device 30 displays the search result output from the search result output unit 25 as described above. For example, the display device 30 includes a liquid crystal display and the like. The display device 30 may be configured as a touch panel so as to be used as the input device 40. The display device 30 of the present embodiment corresponds to a display unit.

The input device 40 includes a mouse, a keyboard, and the like, and receives various setting inputs from the user. The input device 40 of the present embodiment receives a setting input of sequence information by the user in a case where each cell image stored in the image set storage unit 21 as an image set does not have the information of the sequence in which the cell images have been captured. In the present embodiment, the input device 40 corresponds to a sequence information setting reception unit. The sequence information set and input by the user using the input device 40 is stored in the image set storage unit 21 so as to be associated with each cell image. The input device 40 of the present embodiment receives an instruction input for changing the image set by the user. The change of the image set will be described later.

Next, the operation of the cell image search system 1 of the present embodiment will be described with reference to the flowchart shown in FIG. 4.

First, a group of captured images obtained by imaging a cell group in time series using the imaging apparatus 10 are acquired by the captured image acquisition unit 22 and stored (S10).

Then, an image set corresponding to the purpose of searching for a captured image is stored in the image set storage unit 21 by the user (S12). Specifically, in a case where a captured image of a cell group having white streaks while maintaining the undifferentiated state is searched for among a group of captured images, an image set including a cell image of the above-described weak cell group and a cell image of a cell group having white streaks while maintaining the undifferentiated state is stored in the image set storage unit 21. In a case where each cell image of the image set does not have imaging sequence information, the information is set and input by the user using the input device 40, and is given to each cell image (S14).

Then, an image feature amount is extracted from each cell image of the image set. Specifically, in a case where a cell image of the above-described weak cell group and a cell image of a cell group having white streaks while maintaining the undifferentiated state are stored as the image set, the number of cells is extracted as the image feature amount from the cell image of the weak cell group, and the amount (area) of white streaks is extracted as the image feature amount from the cell image of the cell group having white streaks while maintaining the undifferentiated state (S16).

Then, a first captured image to be searched for (to be checked) is specified from the group of captured images stored in the captured image acquisition unit 22 (S18), and the image feature amount is extracted from the captured image (S20). As the first captured image to be searched for, a captured image that was captured first is specified. The image feature amount extracted from the captured image at this time is the same as the image feature amount extracted from a cell image having sequence information indicating the first cell image among the cell images included in the image set. That is, the number of cells is extracted.

Then, based on the image feature amount extracted from the first captured image to be searched for and the image feature amount extracted from the cell image having sequence information indicating the first cell image, the image search unit 24 calculates the similarity between these images (S22). The image search unit 24 determines whether or not these images are similar based on the similarity (S24). Specifically, based on the number of cells included in the first captured image to be searched for and the number of cells included in the cell image having sequence information indicating the first cell image, the similarity between these images is calculated, and it is determined whether or not these images are similar.

In a case where it is determined that the first captured image to be searched for and the cell image having sequence information indicating the first cell image is not similar (NO in S24), a captured image that is captured second among the group of captured images is specified as a captured image to be searched for (S18). Then, as in the case of the first captured image, an image feature amount is extracted from the second captured image, the similarity is calculated based on the extracted image feature amount and the image feature amount of a cell image having sequence information indicating the first cell image, and it is determined whether or not the second captured image and the cell image having sequence information indicating the first cell image are similar based on the similarity (S20 to S24). In a case where it is determined that the second captured image and the cell image having sequence information indicating the first cell image are not similar (NO in S24), a third captured image is specified as a captured image to be searched for, and it is determined whether or not the third captured image is similar to the cell image having sequence information indicating the first cell image in the same manner as the first and second captured images (S24).

As described above, until a captured image similar to the cell image having sequence information indicating the first cell image is searched for among the cell images included in the image set, the captured images to be searched for are changed in the imaging order, and it is sequentially determined whether or not the captured image is similar to the cell image having sequence information indicating the first cell image. In a case where a captured image similar to the cell image having sequence information indicating the first cell image has not been searched for up to the captured image that was captured last, information indicating the situation is displayed on the display device 30 by the search result output unit 25.

On the other hand, in a case where a captured image similar to the cell image having sequence information indicating the first cell image has been searched for (YES in S24), a query image (search target image) is changed to a cell image having sequence information indicating the second cell image (YES in S26). Specifically, the query image (search target image) is changed to a cell image of a cell group having white streaks while maintaining the undifferentiated state.

Then, the captured images are changed again in the imaging order, and it is determined whether or not the captured image is similar to the cell image having sequence information indicating the second cell image (S18 to S24). The image feature amount used at this time is the amount (area) of white streaks. In addition, as described above, the captured images to be searched for at this time are captured images that were captured later than the captured image determined to be similar to the cell image having sequence information indicating the first cell image. That is, the captured images to be searched for are, for example, the captured images G3 to G6 shown in FIG. 3.

Then, in a case where the captured image similar to the cell image having sequence information indicating the second cell image has been searched for (YES in S24) and there is no cell image, that is, no query image included in the image set (NO in S26), the search result output unit 25 displays information, which indicates that captured images similar to all the cell images included in the image set have been searched for, and the searched two captured images on the display device 30 (S28).

Specifically, a captured image similar to a cell image of a weak cell group previously searched for and a captured image similar to a cell image of a cell group having white streaks while maintaining the undifferentiated state are displayed on the display device 30 (S28). As a method of displaying the searched captured images, two captured images may be displayed side by side or may be displayed so as to be sequentially switched. In a case where a captured image similar to the cell image having sequence information indicating the second cell image is not present even though a search has been performed up to the captured image that was captured last, information indicating the situation is displayed on the display device 30 by the search result output unit 25.

Then, the captured image displayed on the display device 30 is checked by the user, and whether or not a desired captured image has been searched for is checked (S30). In a case where a desired captured image has been searched for (YES in S30), the process is ended as it is. Specifically, in a case where a captured image of a cell group that the user desires to observe, which is a captured image of a cell group having white streaks while maintaining the undifferentiated state, has been searched for, the process is ended as it is.

On the other hand, in a case where the searched captured image is not a desired captured image due to some reason (NO in S30), the cell image included in the image set is changed by the user (S32). Specifically, the cell image included in the image set is changed to, for example, a cell image of a cell group that has white streaks while maintaining the undifferentiated state but has a different white streak shape from the cell image included in the image set used for the previous search, a cell image of a cell group that has white streaks while maintaining the undifferentiated state but has a different brightness of the entire image, a cell image of a cell group that has white streaks while maintaining the undifferentiated state but has a different sharpness of the entire image, and the like.

Then, using the changed image set, similar captured images are searched for again (S16 to S30).

In the description of the above embodiment, captured images similar to the cell image of the image set are searched for using the group of captured images stored in advance in the captured image acquisition unit 22. However, the present invention is not limited thereto, and captured images may be searched for in real time during the time-lapse imaging by the imaging apparatus 10. Specifically, every time a captured image is captured by the imaging apparatus 10, it may be determined whether or not the captured image is similar to the cell image included in the image set, and information indicating that captured images similar to all the cell images included in the image set have been searched for and the searched captured images may be displayed on the display device 30 as a search result at the point in time at which the captured images similar to all the cell images included in the image set have been searched for. The order of the plurality of cell images of the image set used at the time of searching is the same as that described in the above embodiment.

In the embodiment described above, captured images are searched for in order to observe a captured image of a cell group having good white streaks while maintaining the undifferentiated state, that is, in order to evaluate the undifferentiated state of the cell group. However, the purpose of the search of captured images is not limited thereto. For example, in a case where a drug such as a growth factor is added to a cell group in the culturing process, in order to evaluate the presence or absence of the medicinal effect of the drug, the presence or absence of the toxicity of the drug, and the like, a group of captured images obtained by imaging the cell group and the cell image of the image set may be checked to search for a captured image similar to the cell image of the image set.

Figure 5A:
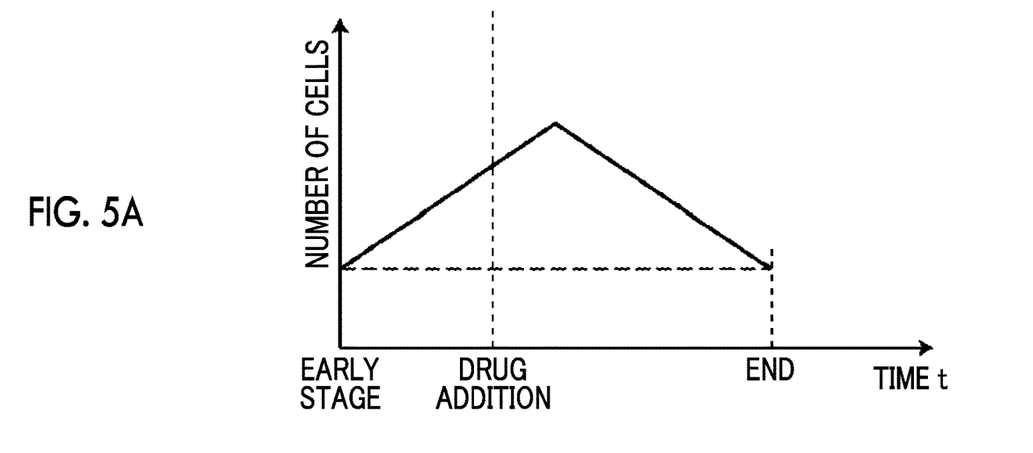
FIGS. 5A and 5B are diagrams showing examples of a change in the number of cells in a case where a drug is added to a cell group in the culturing process.

More specifically, for example, in a case where a drug such as a growth factor is added to a cell group in the culturing process, in a case where the drug is toxic, the number of cells included in the cell group increases from the early stage of culturing to immediately after drug addition but decreases thereafter since cells are killed due to the toxicity of the drug, as shown by the solid line in FIG. 5A. Immediately after drug addition referred to herein is a point in time after drug addition but before drug response. On the other hand, in a case where the drug is not toxic and has no medicinal effect, the number of cells included in the cell group does not change from the early stage of culturing to the end of culturing, as shown by the dotted line in FIG. 5A. That is, it is not possible to correctly evaluate the toxicity of the drug by merely observing the captured image of the cell group in the early stage of culturing and the captured image of the cell group at the end of culturing.

Therefore, an image set including a cell image of a cell group having a small number of cells in the early stage of culturing, a cell image of a cell group having a large number of cells immediately after drug addition, and a cell image of a cell group having a small number of cells at the end of culturing is stored in the image set storage unit 21, and the presence or absence of the toxicity of the drug is evaluated by searching for captured images similar to the three cell images included in the image set among a group of captured images. That is, in a case where all captured images similar to the three cell images included in the image set have been searched for, the added drug is evaluated as being toxic.

Figure 4:
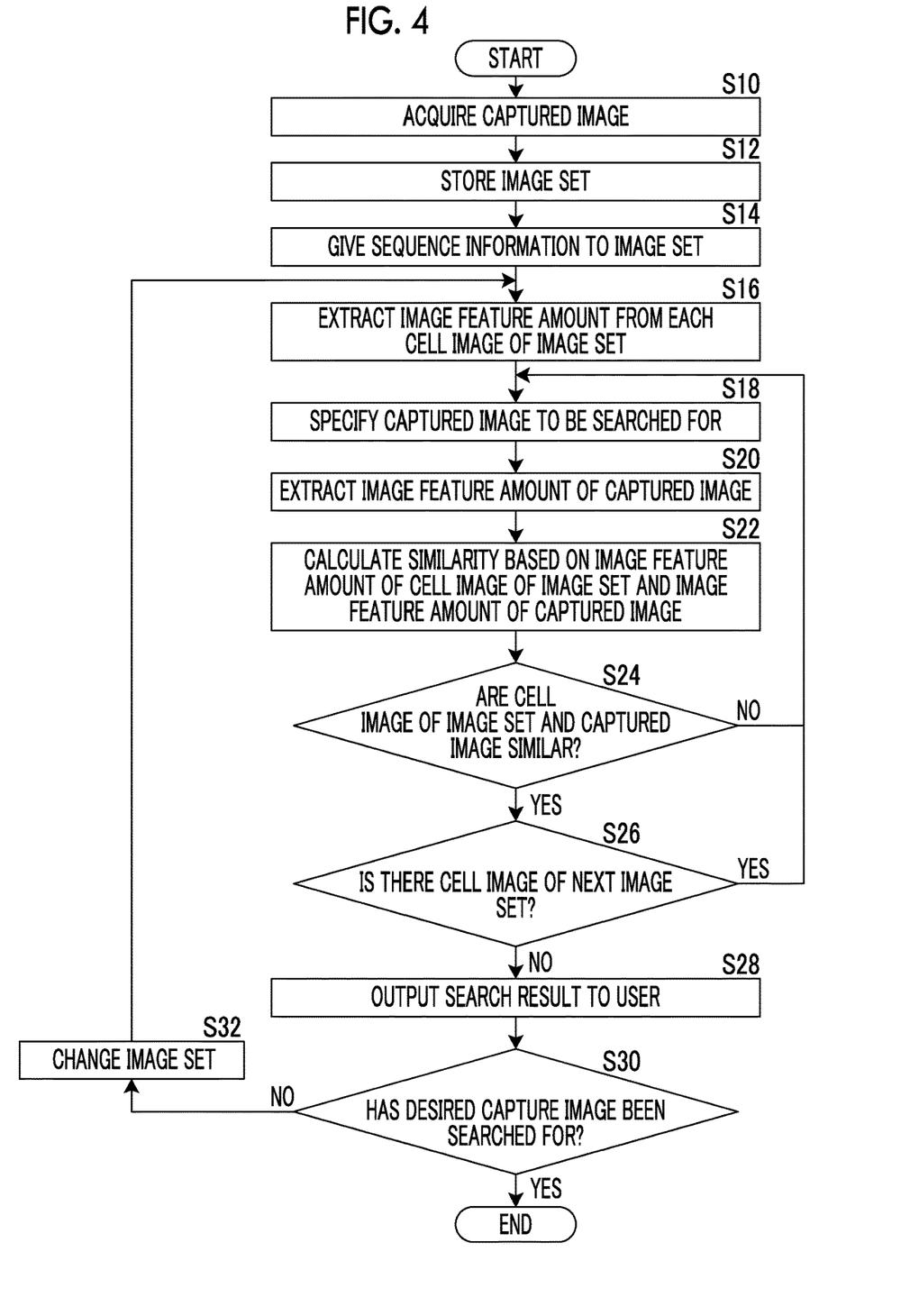
FIG. 4 is a flowchart illustrating the operation of the cell image search system using the embodiment of the cell image search apparatus of the present invention.

The method of searching for a captured image is the same as the flow of the processing of the flowchart shown in FIG. 4. First, using a cell image in the early stage of culturing, a captured image similar to the cell image is searched for. Then, in a case where a captured image similar to the cell image in the early stage of culturing has been searched for, a captured image similar to a cell image immediately after drug addition is searched for using the cell image immediately after drug addition. Finally, in a case where a captured image similar to the cell image immediately after drug addition has been searched for, a captured image similar to a cell image at the end of culturing is searched for using the cell image at the end of culturing. As the image feature amount, the number of cells included in a cell group is used.

Then, in a case where all captured images similar to the three cell images included in the image set have been searched for, the search result output unit 25 displays the searched three captured images on the display device 30. Also in this case, in a case where the captured image displayed on the display device 30 is not a captured image that the user desires, the user may change the cell image included in the image set.

Figure 5B:
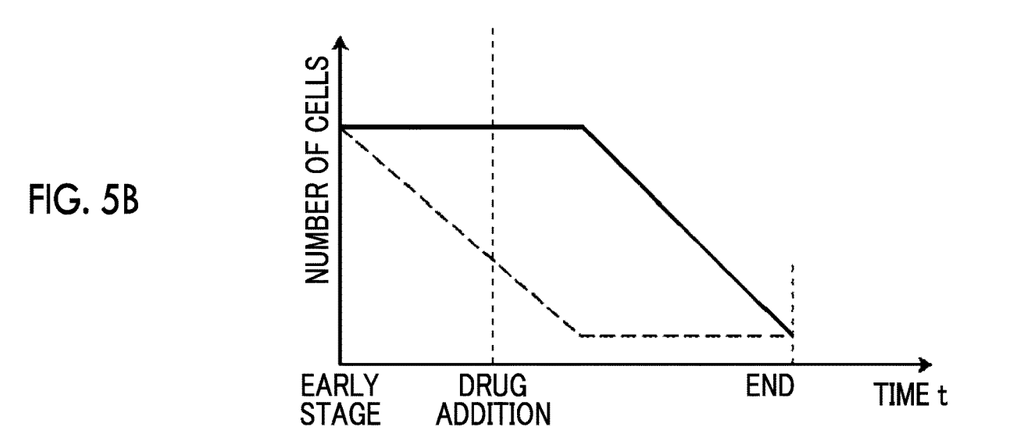

The change in the number of cells in a case where the drug is toxic is not limited to the change shown in FIG. 5A, and the number of cells in a case where the drug is toxic may change as shown by the solid line in FIG. 5B. That is, as shown by the solid line in FIG. 5B, there is also a case in which the number of cells in the cell group already reaches a certain number in the early stage of culturing and the number of cells is maintained immediately after drug addition but decreases thereafter since cells are killed due to the toxicity of the drug. On the other hand, in a case where the drug is not toxic and the cells are simply weakened in the early stage of culturing, the number of cells included in the cell group simply decreases from the early stage of culturing as shown by the dotted line in FIG. 5B. That is, also in this case, by merely observing the captured image of the cell group in the early stage of culturing and the captured image of the cell group at the end of culturing, it is not possible to distinguish whether the drug is toxic or the cells have been simply weakened. For this reason, it is not possible to correctly evaluate the toxicity of the drug.

Therefore, an image set including a cell image of a cell group in which the number of cells in the early stage of culturing is somewhat large, a cell image of a cell group in which the number of cells immediately after drug addition is maintained, and a cell image of a cell group having a small number of cells at the end of culturing may be stored in the image set storage unit 21, and the toxicity of the drug may be evaluated by searching for captured images similar to the three cell images included in the image set among a group of captured images.

Also in this case, in a case where all captured images similar to the three cell images included in the image set have been searched for, the search result output unit 25 displays the searched three captured images on the display device 30.

In addition, in order to evaluate the presence or absence of the medicinal effect of the drug, a group of captured images obtained by imaging a cell group and cell images of the image set may be checked to search for a captured image similar to the cell image of the image set.

Figure 6A:
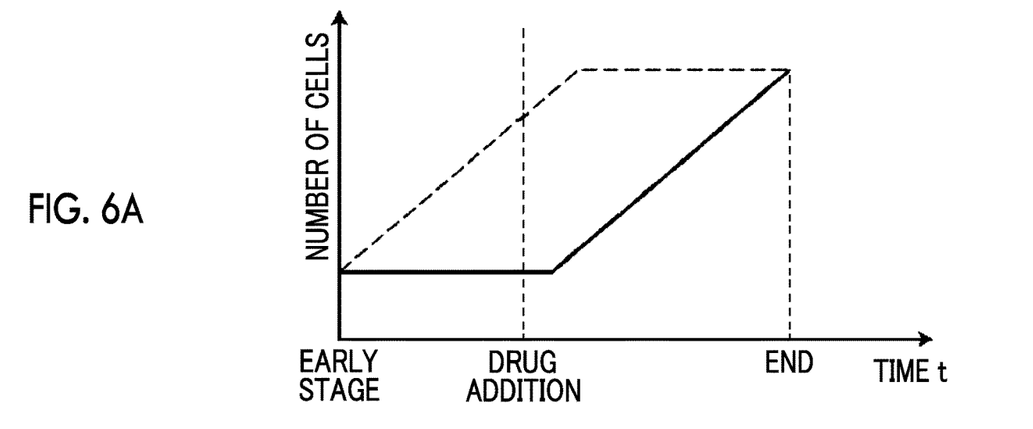
FIGS. 6A and 6B are diagrams showing other examples of the change in the number of cells in a case where a drug is added to a cell group in the culturing process.

More specifically, in a case where the drug has a medicinal effect, the number of cells included in the cell group is small from the early stage of culturing to immediately after drug addition but increases thereafter due to the medicinal effect of the drug, as shown by the solid line in FIG. 6A. On the other hand, also in a case where the drug has no medicinal effect but the cells of the cell group are just active, the number of cells included in the cell group increases from the early stage of culturing to the end of culturing irrespective of the addition of the drug as shown by the dotted line in FIG. 6A. That is, also in this case, by merely observing the captured image of the cell group in the early stage of culturing and the captured image of the cell group at the end of culturing, it is not possible to distinguish whether the drug has a medicinal effect or the cells are just active. For this reason, it is not possible to correctly evaluate the medicinal effect of the drug.

Therefore, an image set including a cell image of a cell group having a small number of cells in the early stage of culturing, a cell image of a cell group having a small number of cells immediately after drug addition, and a cell image of a cell group having a large number of cells at the end of culturing is stored in the image set storage unit 21, and the medicinal effect of the drug may be evaluated by searching for captured images similar to the three cell images included in the image set among a group of captured images. That is, in a case where all captured images similar to the three cell images included in the image set have been searched for, the added drug may be evaluated as having a medicinal effect.

Then, also in this case, in a case where all captured images similar to the three cell images included in the image set have been searched for, the search result output unit 25 displays the searched three captured images on the display device 30. Also in this case, in a case where the captured image displayed on the display device 30 is not a captured image that the user desires, the user may change the cell image included in the image set.

Figure 6B:
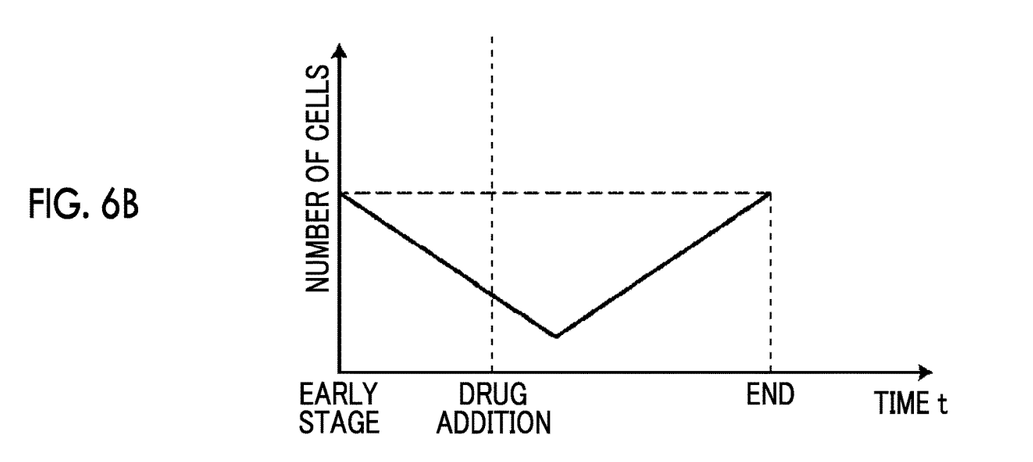

The change in the number of cells in a case where the drug has a medicinal effect is not limited to the change shown in FIG. 6A, and the number of cells in a case where the drug has a medicinal effect may change as shown by the solid line in FIG. 6B. That is, as shown by the solid line in FIG. 6B, there is also a case in which the number of cells in the cell group already reaches a certain number in the early stage of culturing but the number of cells decreases since the cells are weakened and then the number of cells increases due to the addition of the drug. On the other hand, in a case where the drug has no medicinal effect but the cells in the early stage of culturing are just active, the number of cells included in the cell group may not change from the early stage of culturing to the end of culturing without death of cells, as shown by the dotted line in FIG. 6B. That is, also in a case where the number of cells changes as shown in FIG. 6B, by merely observing the captured image of the cell group in the early stage of culturing and the captured image of the cell group at the end of culturing, it is not possible to distinguish whether the drug has a medicinal effect or the cells are just active. For this reason, it is not possible to correctly evaluate the medicinal effect of the drug.

Therefore, an image set including a cell image of a cell group in which the number of cells in the early stage of culturing is somewhat large, a cell image of a cell group immediately after drug addition in which the number of cells is decreased since weakened cells die, and a cell image of a cell group at the end of culturing in which the number of cells increases due to the addition of the drug may be stored in the image set storage unit 21, and the medicinal effect of the drug may be evaluated by searching for captured images similar to the three cell images included in the image set among a group of captured images.

Also in this case, in a case where all captured images similar to the three cell images included in the image set have been searched for, the search result output unit 25 displays the searched three captured images on the display device 30.

In the above description, an image set is set focusing on the change in the number of cells due to the toxicity of the drug, and whether or not captured images similar to the three cell images included in the image set are included in the group of captured images is searched for. However, for example, in a case where cells to be cultured are nerve cells, an image set may be set focusing on the change in the neurite length to evaluate the presence or absence of the toxicity of the drug or the presence or absence of the medicinal effect of the drug.

Figure 7A:
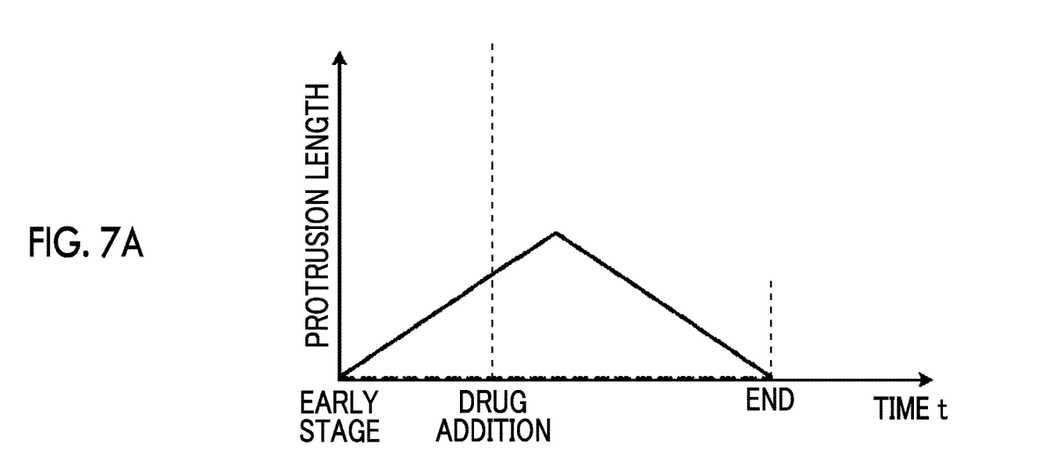
FIGS. 7A and 7B are diagrams showing examples of a change in the protrusion length in a case where a drug is added to a cell group in the culturing process.

More specifically, in a case where the drug is toxic, the protrusion length of the nerve cell included in the cell group increases from the early stage of culturing to immediately after drug addition but decreases thereafter due to the toxicity of the drug, as shown by the solid line in FIG. 7A. On the other hand, in a case where the drug is not toxic and has no medicinal effect, the protrusion length of the nerve cell included in the cell group does not change from the early stage of culturing to the end of culturing, as shown by the dotted line in FIG. 7A. That is, by merely observing the captured image of the cell group in the early stage of culturing and the captured image of the cell group at the end of culturing, it is not possible to distinguish whether the drug is toxic or the drug is neither toxic nor medicinal effect. For this reason, it is not possible to correctly evaluate the toxicity of the drug.

Therefore, an image set including a cell image of a cell group having a short protrusion length in the early stage of culturing, a cell image of a cell group having an increased protrusion length immediately after drug addition, and a cell image of a cell group having a decreased protrusion length at the end of culturing may be stored in the image set storage unit 21, and the presence or absence of the toxicity of the drug may be evaluated by searching for captured images similar to the three cell images included in the image set among a group of captured images. That is, in a case where all captured images similar to the three cell images included in the image set have been searched for, the added drug may be evaluated as being toxic.

Figure 7B:
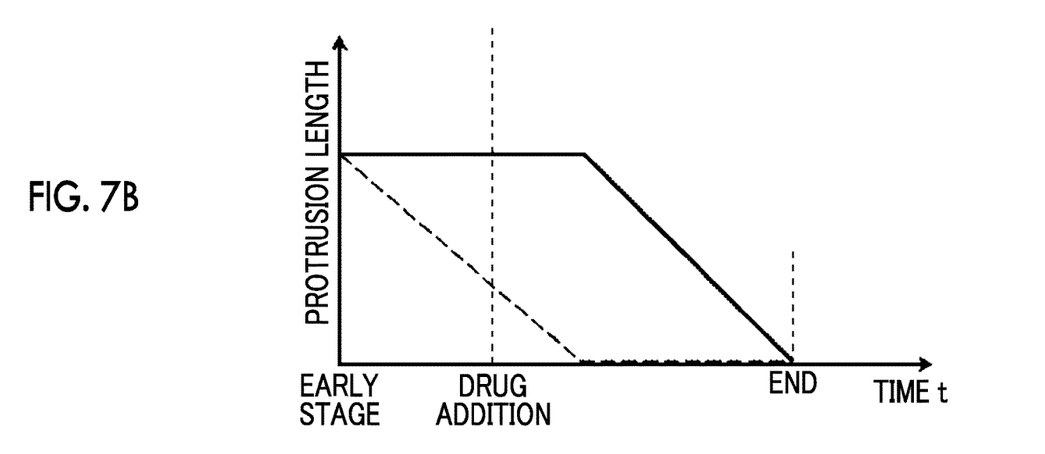

The change in the protrusion length of the nerve cell in a case where the drug is toxic is not limited to the change shown in FIG. 7A, and the protrusion length of the nerve cell in a case where the drug is toxic may change as shown by the solid line in FIG. 7B. That is, as shown by the solid line in FIG. 7B, there is also a case in which the protrusion length of the nerve cell already increases to some extent in the early stage of culturing and the length is maintained immediately after drug addition but decreases thereafter due to the toxicity of the drug. On the other hand, also in a case where the drug is not toxic and the cells are simply weakened in the early stage of culturing, the protrusion length of the nerve cell included in the cell group simply decreases from the early stage of culturing as shown by the dotted line in FIG. 7B. That is, also in this case, by merely observing the captured image of the cell group in the early stage of culturing and the captured image of the cell group at the end of culturing, it is not possible to distinguish whether the drug is toxic or the cells have been simply weakened. For this reason, it is not possible to correctly evaluate the toxicity of the drug.

Therefore, an image set including a cell image of a cell group in which the protrusion length in the early stage of culturing is somewhat large, a cell image of a cell group in which the protrusion length immediately after drug addition is maintained, and a cell image of a cell group having a decreased protrusion length at the end of culturing may be stored in the image set storage unit 21, and the toxicity of the drug may be evaluated by searching for captured images similar to the three cell images included in the image set among a group of captured images.

Also in the case of evaluating not only the presence or absence of the toxicity of the drug but also the presence or absence of the medicinal effect of the drug, an image set may be set focusing on a change in the neurite length, and a captured image may be searched for.

Figure 8A:
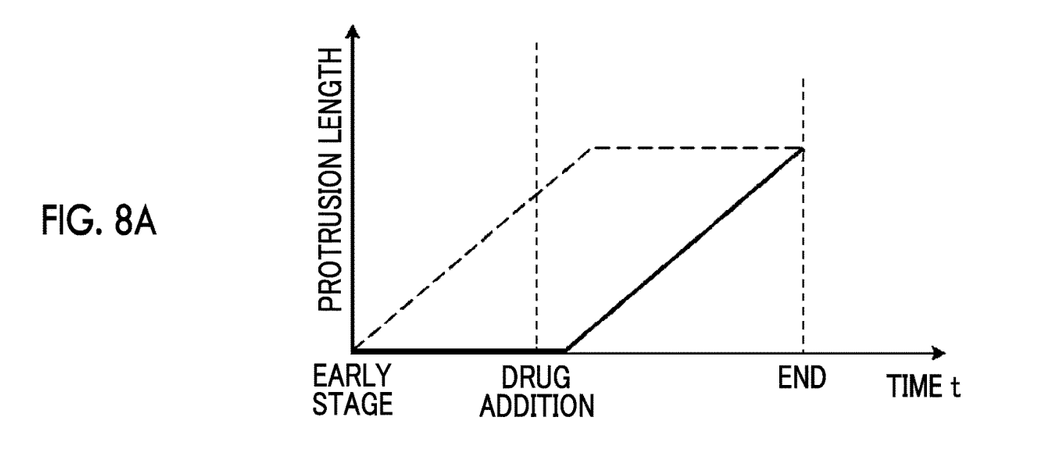
FIGS. 8A and 8B are diagrams showing other examples of the change in the protrusion length in a case where a drug is added to a cell group in the culturing process.

More specifically, in a case where the drug has a medicinal effect, the protrusion length of the nerve cell included in the cell group is short from the early stage of culturing to immediately after drug addition but increases thereafter due to the medicinal effect of the drug, as shown by the solid line in FIG. 8A. On the other hand, also in a case where the drug has no medicinal effect but the cells of the cell group are just active, the protrusion length of the nerve cell included in the cell group increases from the early stage of culturing to the end of culturing irrespective of the addition of the drug as shown by the dotted line in FIG. 8A. That is, also in this case, by merely observing the captured image of the cell group in the early stage of culturing and the captured image of the cell group at the end of culturing, it is not possible to distinguish whether the drug has a medicinal effect or the cells are just active. For this reason, it is not possible to correctly evaluate the medicinal effect of the drug.

Therefore, an image set including a cell image of a cell group having a short protrusion length in the early stage of culturing, a cell image of a cell group having a short protrusion length immediately after drug addition, and a cell image of a cell group having an increased protrusion length at the end of culturing may be stored in the image set storage unit 21, and the medicinal effect of the drug may be evaluated by searching for captured images similar to the three cell images included in the image set among a group of captured images. That is, in a case where all captured images similar to the three cell images included in the image set have been searched for, the added drug may be evaluated as having a medicinal effect.

Figure 8B:
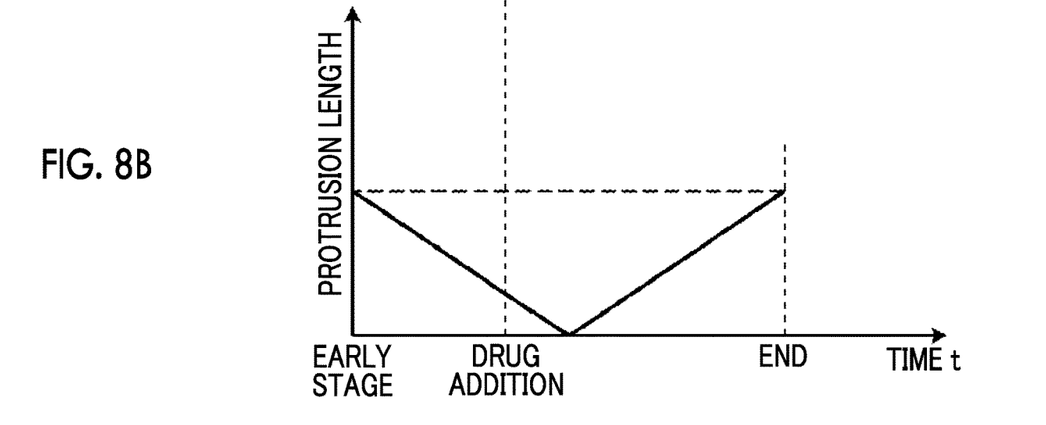

The change in the protrusion length of the nerve cell in a case where the drug has a medicinal effect is not limited to the change shown in FIG. 8A, and the protrusion length of the nerve cell in a case where the drug has a medicinal effect may change as shown by the solid line in FIG. 8B. That is, as shown by the solid line in FIG. 8B, there is also a case in which the protrusion length of the nerve cell already reaches a certain length in the early stage of culturing but the protrusion length of the nerve cell decreases since the cells are weakened and then the protrusion length of the nerve cell increases due to the addition of the drug. On the other hand, in a case where the drug has no medicinal effect but the cells in the early stage of culturing are just active, the protrusion length of the nerve cell may not change from the early stage of culturing to the end of culturing as shown by the dotted line in FIG. 8B. That is, also in a case where the number of cells changes as shown in FIG. 8B, by merely observing the captured image of the cell group in the early stage of culturing and the captured image of the cell group at the end of culturing, it is not possible to distinguish whether the drug has a medicinal effect or the cells are just active. For this reason, it is not possible to correctly evaluate the medicinal effect of the drug.

Therefore, an image set including a cell image of a cell group in which the protrusion length in the early stage of culturing is somewhat large, a cell image of a cell group immediately after drug addition in which the protrusion length is short since cells are weakened, and a cell image of a cell group at the end of culturing in which the protrusion length increases due to the addition of the drug may be stored in the image set storage unit 21, and the medicinal effect of the drug may be evaluated by searching for captured images similar to the three cell images included in the image set among a group of captured images.

In a case where the toxicity or medicinal effect of the drug is evaluated by searching for a captured image using three or more cell images as an image set as described above, in the case of searching for a captured image based on the second and subsequent cell images among the cell images included in the image set, that is, in the case of searching for a captured image based on a cell image immediately after drug addition, the search accuracy is improved by limiting the captured image to be searched for to the captured image before drug response since the cell image immediately after drug addition is a cell image before drug response. In the case of performing a real-time search while performing imaging using the imaging apparatus 10, it is possible to obtain a search result without wasteful imaging.

Therefore, for example, a search target period in which captured images to be searched for were captured may be set in advance, and captured images similar to the second cell image may be searched for only among the captured images within the search target period. The search target period described above is a period from a predetermined point in time after the start of culturing to before drug response immediately after drug addition, and changes depending on the cell type, the type of drug to be added, and the like. Therefore, it is preferable that, for example, a look-up table in which the cell type is associated with the search target period, a look-up table in which the drug and the search target period are associated with each other, or a look-up table in which the cell type and the drug and the search target period are associated with each other is set in advance and the user acquires the look-up table by setting and inputting the cell type and/or the drug using the input device 40. Specifically, for example, in a case where the drug is an apoptosis inducer, since the drug response is about half day to one day depending on the cell cycle, it is preferable to set the search target period to three hours or less that is shorter than that. In addition, in a case where the drug is a necrosis inhibitor, cell necrosis is more acute than cell suicide in many cases, which is about 1 hour. For this reason, it is preferable to set the search target period to several minutes to several tens of minutes shorter than that. In a case where the drug is a differentiation inducer from iPS cell-derived nerve cell precursor cells to mature nerve cells, for example, this matures for about eight days. Therefore, it is preferable to set the search target period to one to two days shorter than that.

Alternatively, the time scale of natural change over time of the target cell may be estimated using a captured image before drug addition, and the search target period may be set. Specifically, by analyzing the captured image before drug addition, a time relevant to cell proliferation, such as a time at which the number of cells is doubled by cell division or a time at which the neurite length increases to a certain length, may be calculated, and the time or less may be set as a search target period.

As described above, in a case where a cell image immediately after drug addition is used as a cell image of an image set, for example, a cell group in the culturing process may be imaged in time series, an image captured immediately after drug addition may be manually or automatically specified by attaching a label to the image captured immediately after drug addition, and this image may be used as a cell image immediately after drug addition. As the label, for example, a letter, a symbol, or the like that can be recognized as being captured immediately after drug addition may be included as a part of the file name of the image. Alternatively, information indicating that the image was captured immediately after drug addition may be included in the metadata of the image, and the metadata may be read and specified at the time of search. Alternatively, identification information, such as a mark, may be embedded in an image captured immediately after drug addition, and it may be specified that the image is an image captured immediately after drug addition by recognizing the identification information in the image at the time of search.

Alternatively, a plurality of images captured immediately after drug addition may be specified, and a cell image of the image set may be selected from the plurality of images. As a method of specifying a plurality of images captured immediately after drug addition, for example, a label may be attached to an image captured most recently from the point in time of drug addition, and an image captured within a preset imaging period from the point in time at which the image to which the label is attached is captured may be specified as an image captured immediately after drug addition. Alternatively, labels may be attached to images captured within a preset imaging period from the point in time of drug addition, and an image having no change in the shape of the cell from the point in time of drug addition, among the images to which the labels are attached, may be specified as an image immediately after drug addition.

Alternatively, labels may be sequentially attached to images captured from the point in time of drug addition, and an image having no change in the state of the cell, among the images to which the labels are attached, may be specified as an image immediately after drug addition.

Alternatively, imaging time information may be given to all images obtained by imaging the cell group in time series in the culturing process, and a cell image immediately after drug addition may be specified by comparing the imaging time information with the drug addition time. The imaging time information may be written in the file name and read out from the file name, or may be read out from the metadata.

Alternatively, images captured immediately after drug addition and other images may be placed in separate folders.

In the above description of the embodiment, a case where two cell images are used as an image set and a case where three cell images are used as an image set has been described. However, four or more cell images may be used as an image set. The larger the number of cell images is, the more accurate search can be performed.

In the above description of the embodiment, an example in which a search is performed by extracting white streaks, the number of cells, or the protrusion length as the image feature amount has been described. However, as described above, any image feature amount may be used as long as the image feature amount is correlated with the quality of the cell and is a reversible shape feature. For example, there is a case where the shape of a cell having a stem cell property changes from an elongated shape to a circular shape and changes to the elongated shape again in the culturing process. Therefore, the shape of the cell may be used as the image feature amount. In this case, a cell image of a cell group including elongated cells in the early stage of culturing, a cell image of a cell group including circular cells mature to some extent, and a cell image of a cell group including elongated cells at the end of culturing may be used as an image set.

In the exemplary embodiments described above, exemplary embodiments have been described in which each of the sections illustrated in FIG. 1 (including for example the captured image acquisition unit 22, the image feature amount extraction unit 23, the image search unit 24, and the search result output unit 25) are implemented by a software configuration employing the central processing unit, however the technology disclosed herein is not limited thereto. For example, configuration may be made wherein at least one out of each of the sections illustrated in FIG. 1 is implemented by a hardware configuration. In such cases, for example an Application Specific Integrated Circuit (ASIC) that is an integrated circuit in which plural functions are consolidated into one circuit may be employed, or a programmable logic device may be employed.

What is claimed is:

1. A cell image search apparatus, comprising:
a processor, and
a memory coupled to the processor,
wherein the processor is configured to:
store an image set including a plurality of cell images, each having information of sequence, at different points in time in a cell culturing process, the cell images obtained by imaging a specific cell in time series;
acquire a plurality of captured images, each having information of sequence, obtained by imaging cells in time series;
extract an image feature amount from each cell image of the image set and each of the plurality of captured images;
search for a captured image similar to each cell image of the image set, among the plurality of captured images, based on image feature amounts of each cell image of the image set and the plurality of captured images; and
output a search result in a case where a set of at least two captured images, each being similar to respective cell images included in the image set, the at least two captured images having the same imaging order in a sequence as the respective cell images, are found.

2. The cell image search apparatus according to claim 1, further comprising:
a display controller that displays the searched captured images on a display in a case where the captured images similar to at least two cell images included in the image set are searched for.

3. The cell image search apparatus according to claim 1, wherein cell images of the image set are images having different cell shapes.

4. The cell image search apparatus according to claim 3, wherein the image set includes a cell image obtained by imaging a cell group having white streaks and a cell image obtained by imaging a weak cell group before white streaks are generated.

5. The cell image search apparatus according to claim 3, wherein the image set includes three or more cell images.

6. The cell image search apparatus according to claim 1, wherein each cell image of the image set is an image obtained by imaging the same cell in time series.

7. The cell image search apparatus according to claim 1, wherein each cell image of the image set is an image obtained by imaging a cell group to which drugs having different concentrations are added.

8. The cell image search apparatus according to claim 1, wherein the processor is further configured to receive a setting input of sequence information given to each cell image of the image set.

9. The cell image search apparatus according to claim 1, further comprising:
an imaging that captures the captured image, processor performs the search in real time during time-lapse imaging.

10. The cell image search apparatus according to claim 1, wherein the processor performs the search using the plurality of captured images stored in advance.

11. A cell image search method, comprising:
storing an image set, which includes a plurality of cell images, each having information of sequence, at different points in time in a cell culturing process, in advance, the cell images obtained by imaging a specific cell in time series;
acquiring a plurality of captured images, each having information of sequence, obtained by imaging cells in time series;
extracting an image feature amount from each cell image of the image set and each of the plurality of captured images;
searching for a captured image similar to each cell image of the image set, among the plurality of captured images, based on image feature amounts of each cell image of the image set and the plurality of captured images; and
outputting a search result in a case where a set of at least two captured images, each being similar to respective cell images included in the image set, the at least two captured images having the same imaging order in a sequence as the respective cell images, are found.

12. A non-transitory computer-readable storage medium storing a cell image search program for causing a computer to:
acquire a plurality of captured images, each having information of sequence, obtained by imaging cells in time series;
extract an image feature amount from each cell image of an image set, which is stored in advance and includes a plurality of cell images at different points in time in a cell culturing process, and each of the plurality of captured images;
search for a captured image similar to each cell image of the image set, among the plurality of captured images, based on image feature amounts of each cell image of the image set and the plurality of captured images; and
output a search result in a case where a set of at least two captured images, each being similar to respective cell images included in the image set, the at least two captured images having the same imaging order in a sequence as the respective cell images, are found.

* * * * *